United States Patent Office 3,363,746
Patented Jan. 16, 1968

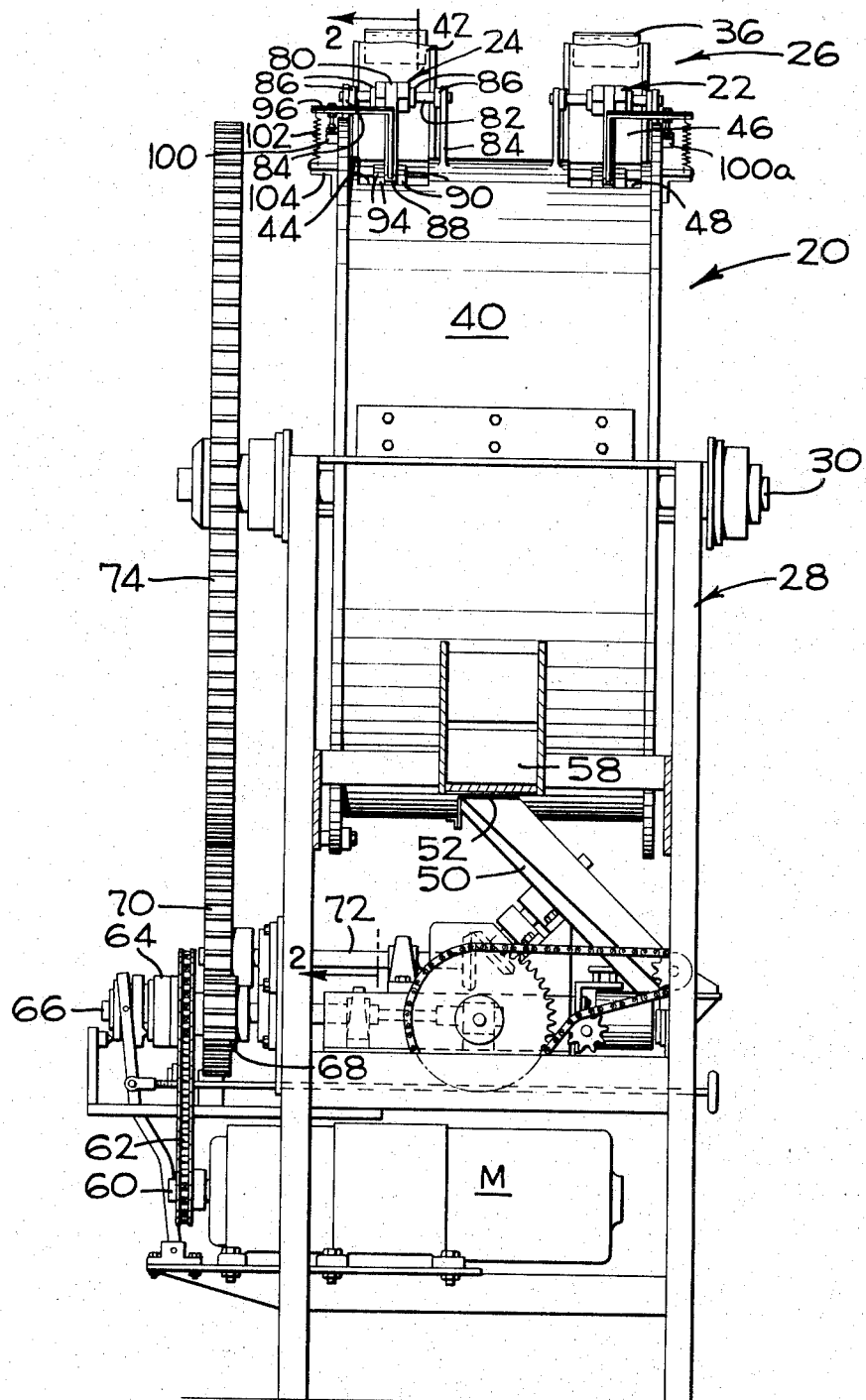
FIG_1

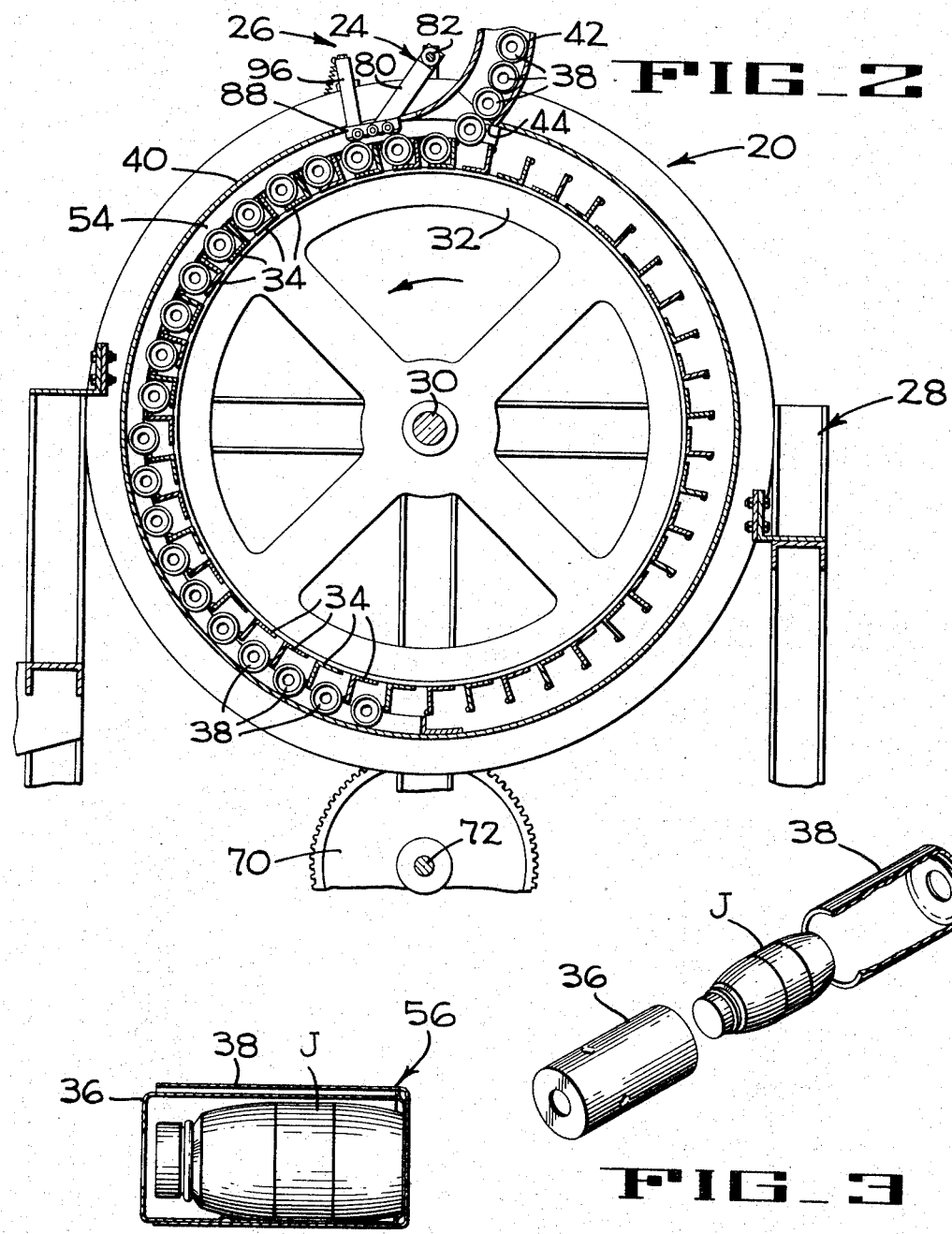

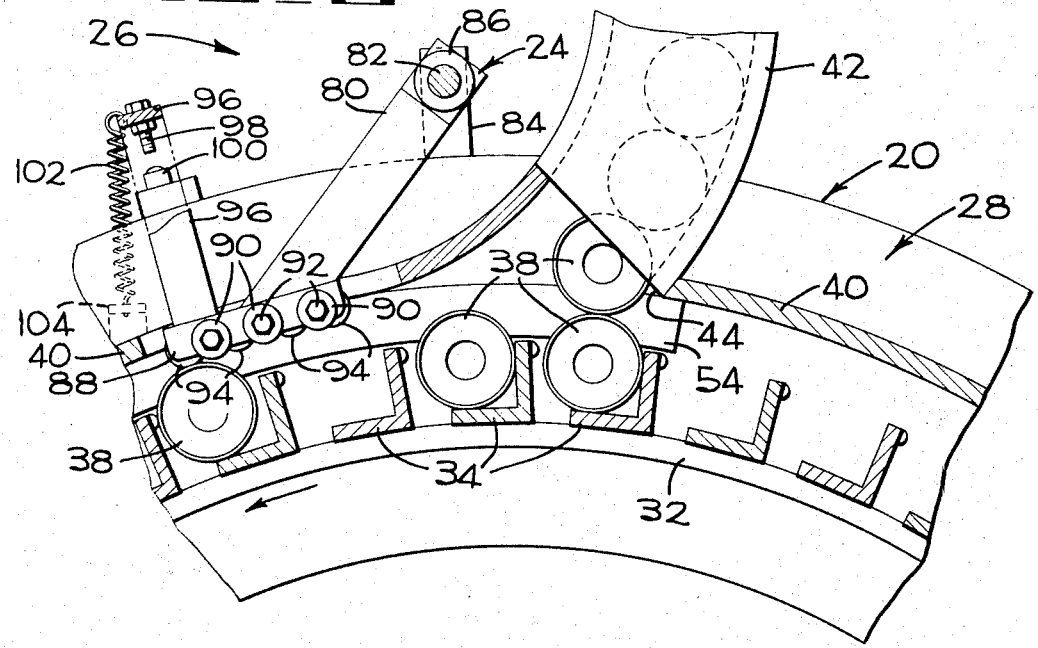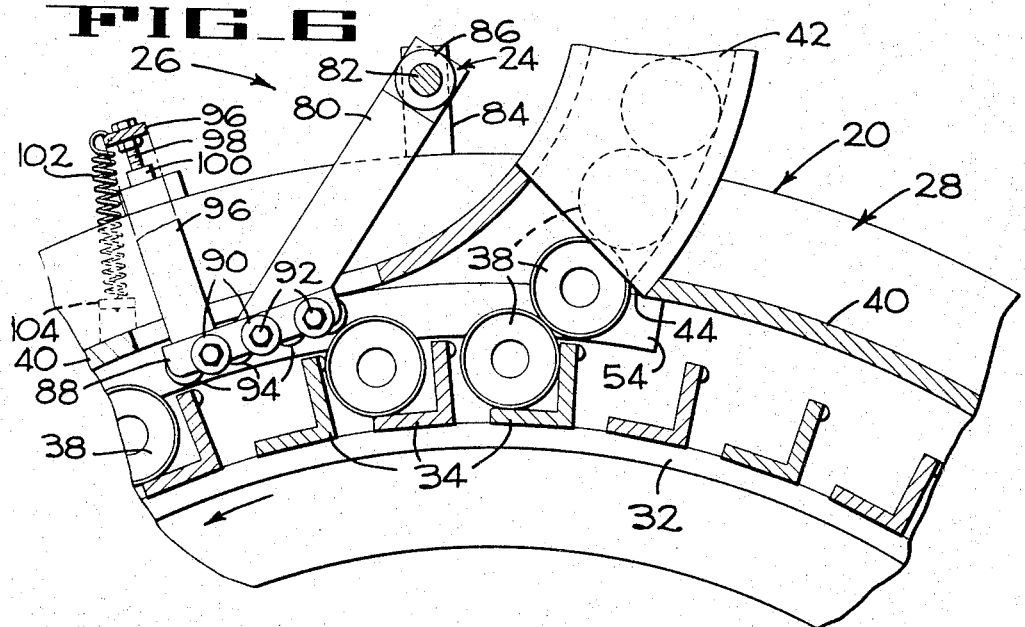

3,363,746
DETECTOR FOR TWO-PIECE CONTAINER
Richard R. Griswold, Hoopeston, Ill., and Donald G. Gagnon, Republic, and George E. Malafa, Neosho, Mo., assignors to FMC Corporation, San Jose, Calif., a corporation of Delaware
Filed Oct. 12, 1966, Ser. No. 586,248
3 Claims. (Cl. 198—232)

ABSTRACT OF THE DISCLOSURE

A movable detector having a series of closely spaced rollers thereon for sensing the presence of defective container elements of two-piece containers, or for detecting the absence of one or both container elements, from series of equally spaced container elements moved therepast by conveying means, and upon such detection effecting the deactivation of the conveying means.

---

The present invention pertains to apparatus for loading an article such as a glass jar in a two-piece telescoping capsule, and more particularly relates to a device for detecting injury to or the absence of either one or both pieces of the capsule from loading position and for interrupting the loading operation upon such detection.

In capsule loading machines of the type disclosed in the copending application for United States Letters Patent of Milton L. Croall filed on July 19, 1965, and having Ser. No. 472,696, a capsule loader is disclosed which encapsulates glass jars within two-piece telescoping capsules, each capsule being defined by a cartridge and a carrier. The capsules and encapsulated glass jars are then passed through a series of rotary pressure cookers and coolers which sterilize the contents of the jars. Since the jars are confined within the capsules, the jars are easily controlled as they are moved around spiral tracks within the cookers and coolers, and if any of the jars should break due to thermal or mechanical shock, the broken jars will be retained within the capsules until after the capsules and broken jars have been removed from the cookers and coolers. Thus, during normal operation all broken encapsulated jars will be moved completely through the cooking and cooling system before they are removed from their associated capsule and accordingly, will not be deposited within the cookers or coolers causing damage to the equipment or to other jars passing therethrough.

It has been determined that one or both elements of a capsule, hereinafter termed the cartridge and the carrier, will occasionally be dented or not deposited in position to be moved into telescoping engagement over the associated jar. Accordingly, the jar will not be completely confined, and if breakage occurs pieces of the jar are apt to fall inside the cookers or coolers causing damage thereto or to following jars or capsules that are being advanced through the cookers and coolers.

It is, therefore, one object of the present invention to provide a detector for a capsule loader.

Another object is to provide a cartridge-carrier detector capable of terminating the operation of a capsule loader in the event either the cartridge or the associated carrier, or both the cartridge and carrier, is absent from the capsule loading position or is severely dented.

Another object is to provide a cartridge-carrier detector which gently contacts the cartridge or carrier to prevent abrasion of the cartridge or carrier.

Another object is to provide a cartridge-carrier detector which detects the absence of a cartridge or carrier from capsule loading position and terminates operation of the loader upon such detection.

These and other objects and advantages of the present invention will became apparent from the following description and accompanying drawings, in which:

FIGURE 1 is an end elevation of a capsule loader illustrating the cartridge-carrier detector of the present invention disposed in position to detect the presence or absence of a cartridge or carrier from loading position.

FIGURE 2 is a vertical section through the capsule loader taken substantially along the lines 2—2 of FIGURE 1.

FIGURE 3 is an enlarged perspective illustrating a cartridge, a carrier, and a jar disposed therebetween before the jar is loaded or encapsulated within the cartridge and carrier, certain parts of the carrier being cut away.

FIGURE 4 is an enlarged section taken through a capsule having a jar encapsulated therein, which capsule is defined by a cartridge telescoped within a carrier.

FIGURE 5 is an enlarged operational view of the carrier detector illustrating the detector in inactive position riding along the surface of a carrier in loading position.

FIGURE 6 is a view similar to FIGURE 5 but illustrates the carrier detector in an active position detecting the absence of the carrier from capsule loading position and closing a switch thereby terminating the loading operation.

FIGURE 7 is a diagrammatic wiring diagram illustrating detector switches in series with the drive motor of the capsule loader.

In general, the capsule loader 20 (FIGS. 1 and 2) with which the cartridge detector 22 and carrier detector 24 of the cartridge-carrier detector 26 of the present invention is associated is adapted to handle glass jars J (FIGS. 3 and 4) that are filled with a product such as milk and are closed and capped prior to being introduced into the capsule loader 20. Since the capsule loader is fully described in the aforementioned Croall et al. application the loader will only briefly be described herein. Reference may be had to said application if a more detailed description of the loader is desired.

Briefly, the capsule loader 20 comprises a frame 28 having a shaft 30 journalled thereon to which a combiner reel 32 is keyed. A plurality of evenly spaced elongated angle loading bars 34 are secured to the reel 32 and each bar 34 is arranged to receive a cartridge 36, a carrier 38 and a jar J with the jar being disposed between the cartridge and carrier.

As indicated in FIGURES 1 and 2, the combining reel 32 is surrounded by a stationary drum 40 that is supported by the frame 28 and serves to maintain the cartridges, carriers, and jars in their associated angle loading bars 34. The carriers 38 enter the reel 32 through a feed chute 42 and through an aperture 44 in the upper portion of the drum 40 adjacent one side thereof, while the cartridges 36 enter the reel through a feed chute 46 and an aperture 48 of the drum 40 adjacent the other side thereof. The jar J enter the reel 32 near its lowermost point by means of a 45 degree transfer turret 50 which lifts the jars through a centrally disposed aperture 52 in the drum 40 and into the reel adjacent its transverse midpoint.

Stationary generally helical guide segments 54 (only one being shown in FIGURE 2) engages the carriers and cartridges as the reel 32 rotates in a counterclockwise direction (FIG. 2) and cams the cartridge and carrier from the spaced position illustrated in FIGURE 3 to the position shown in FIGURE 4 wherein the cartridge and carrier cooperate to define a capsule 56 with a jar J confined therein. The capsule 56 and encapsulated jar are thereafter discharged from the reel 32 through an aperture 58 in the drum 40 for advancement through the aforementioned rotary cookers and coolers (not shown).

The combining reel 32 and associated parts of the capsule loader 20 are continuously driven in a counterclockwise direction (FIG. 2) during normal operation by a motor M of the well known type that includes a magnetic brake, which brake is effective to stop the motor approximately ¼ second after the power to the motor is interrupted. The motor M is mounted on the frame 28 and includes an output shaft 60 which is connected by a chain drive 62 to a slip clutch 64 of the type manufactured by the Mercury Clutch Division of Automatic Steel Products, Inc., Canton, Ohio, as model No. AC–4868. The slip clutch 64 is mounted on and drives a shaft 66 which is journalled in the frame 28. A gear 68 is keyed to the shaft 66 and meshes with a larger gear 70 that is keyed to one end of an intermediate shaft 72 journalled in the frame 28. The gear 70 meshes with a large diameter gear 74 which is keyed to the reel shaft 30.

As mentioned previously, if either a cartridge or a carrier, or both a cartridge and a carrier, is severely dented or is missing from an angle loading bar 34 having a jar therein, the jar will not be properly encapsulated. If the jar is not properly encapsulated, the capsule loader 20, other capsules or jars, or the cookers and coolers (not shown) may be damaged by broken glass or the like. Accordingly, the cartridge-carrier detector 26 of the present invention is provided to detect dented cartridges and carriers, or missing cartridges and carriers, and upon such detection is arranged to deactivate the drive motor M and activate the magnetic brake.

The cartridge-carrier detector 26 comprises the aforementioned cartridge detector 22 and the carrier detector 24. Since the cartridge detector 22 is substantially the same as the carrier detector 24, only the carrier detector will be described in detail.

The carrier detector 24 (FIGS. 1, 5 and 6) comprises an inclined support arm 80 pivotally supported at its upper end on a shaft 82 which is supported by spaced upstanding pedestals 84 secured to the frame 28. Collars 86 are secured to the shaft 82 to hold the shaft from axial movement relative to the pedestal 84 and to hold the arm 80 from axial movement relative to the shaft 82. A roller supporting shoe 88 is welded to the lower end of the arm 80 and has an inner row of three nylon rollers 90 journalled on capscrews 92 screwed into one vertical wall of the shoe, and an outer row of four nylon rollers 94 journalled on capscrews which are screwed into the other vertical wall of the shoes. As indicated in FIGURE 5 the axes of the inner rollers 90 are disposed midway between the axes of the outer rollers measured in the direction of movement of the carriers. Thus, the peripheries of the combined groups of inner and outer rollers cooperate to define a continuous rolling surface that is sufficiently long to engage and span two carriers disposed in adjacent angle loading bars 34, but is of insufficient length to span the center-to-center distance between three carriers.

An angle switch actuating bracket 96 is welded to the shoe 88 and has a switch actuating bolt 98 secured to one end thereof and disposed in position to engage and open a switch 100 when the rollers 90 and 94 move downwardly below the path of movement of the outer peripheries of undented carriers 38.

If a carrier is dented or is missing, the shoe 88 and rollers supported thereby will move downwardly as indicated in FIGURE 6 and will open the switch 100 thereby de-energizing the motor M and activating the magnetic brake which substantially immediately stops the motor M and the reel 32. A tension spring 102 is connected between the angle bracket 96 and a bracket 104 secured to the frame 28 thereby urging the rollers 90 and 94 downwardly toward the combining reel 32.

As mentioned before, if either the cartridge or the carrier is missing or is badly dented, a capsule 56 will not be properly formed, and the jar J will not be encapsulated in the desired manner. Accordingly, when a cartridge is dented or is absent from one of the angle loading bars 34, the switch 100a (FIG. 1) of the cartridge-detector 22 will be opened thereby de-energizing the motor M and energizing its magnetic brake.

The switches 100 and 100a of the carrier detector 24 and cartridge detector 22 are normally closed switches which are connected in series with the motor M as diagrammatically illustrated in FIGURE 7. Thus, the opening of either or both switches 100 or 100a by a defective or a missing carrier or cartridge will open the circuit from main lines L1 and L2 to the motor M thereby de-energizing the motor and activating the brake in a well known manner effecting termination of movement of the reel 32. After correction of the difficulty by adding an undamaged cartridge or carrier to the loading bar 34 of the combiner reel 32, the switches 100 and 100a will again return to their normally closed positions and the motor M may again be started by a start switch (not shown).

From the foregoing description it will be apparent that the cartridge-carrier detector 26 will detect either a damaged cartridge or carrier, will detect the absence of either a cartridge or carrier, or will detect the damage or absence of both a cartridge and a carrier. It will also be apparent that upon such detection the motor will be de-energized thereby immediately stopping the combiner reel so that the difficulty can be corrected. The detector also includes a series of nylon rollers which rotatably contact the cylindrical articles passing thereby and accordingly prevents abrasion of the articles.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. Apparatus for detecting the presence of a damaged element or the absence of an element of a two-piece container, which container is defined by two of the elements after the two elements have been moved into telescoping relationship from spaced positions comprising; conveying means for supporting a series of the container elements and for advancing the elements along a predetermined path, drive means connected to said conveying means for driving said conveying means, element contacting means positioned to engage the elements as the elements move therepast, said element contacting means including a series of closely spaced freely rotatable members which upon engagement with the container elements move at substantially the same peripheral speed as the contacted portion of the elements and which cooperate to define an element engaging rolling surface of sufficient length to span the distance between the centers of two adjacent container elements but of insufficient length to span the distance between the centers of three container elements, means supporting said element contacting means for movement between a first position when contacted by undamaged elements moving therepast and a second position when contacting a damaged element or when an element is missing from the series of elements, and switch means operatively connected to said drive means and actuated by said element contacting means when in said second position to deactivate said drive means and terminate movement of said conveying means.

2. Apparatus for detecting the presence of a damaged element or the absence of an element of a two-piece container, which container is defined by two of the elements after the two elements have been moved into telescoping relationship from spaced positions comprising; conveying means for supporting a series of the container elements and for advancing the elements along a predetermined path, drive means connected to said conveying means for driving said conveying means, element contacting means positioned to engage the elements as the elements move therepast, means supporting said element contacting means for movement between a first position when contacted by undamaged elements moving therepast and a second position when contacting a damaged element or when an element is missing from the series of elements, and switch means operatively connected to said drive means and actuated by said element contacting means when in said second position to deactivate said drive means and terminate movement of said conveying means, said element contacting means including a shoe having a first series of rollers journalled on one side thereof and lying in a first plane parallel to the path of movement of said associated elements and a second series of rollers journalled on the other side of said shoe lying in a second plane parallel to said first plane, the axes of rotation of said first series of rollers being disposed midway between the axes of rotation of adjacent ones of said second series of rollers whereby the peripheries of the rollers overlap to provide a continuous element engaging rolling surface of sufficient length to span the distance between the centers of two adjacent container elements but of insufficient length to span the distance between the centers of three container elements.

3. An apparatus according to claim 2 wherein said conveying means includes a series of equally spaced container supporting bars which are elongated in a direction transversely of the movement of said conveying means and wherein each bar is adapted to support a cooperating pair of spaced container elements for advancing the pair of elements on each bar along separate predetermined paths; said apparatus including separate and independent element contacting means, supporting means, and switch means for the elements moving along each of said paths; said switch means associated with each of said paths being connected in series with said drive means whereby movement of either of said element contacting means into said second position in response to the detection of a missing or damaged container element will deactivate said drive means and terminate movement of said conveying means.

References Cited
UNITED STATES PATENTS

| | | | |
|---|---|---|---|
| 1,154,611 | 9/1915 | Burpee | 198—212 |
| 1,557,455 | 10/1925 | Hansen | 198—232 |
| 1,613,330 | 1/1927 | Prescott | 198—232 |
| 2,769,532 | 11/1956 | Witt | 198—232 |
| 2,946,418 | 7/1960 | Leeson | 192—18 |

RICHARD E. AEGERTER, *Primary Examiner.*